US010572707B2

(12) United States Patent
Shen et al.

(10) Patent No.: US 10,572,707 B2
(45) Date of Patent: Feb. 25, 2020

(54) TRANSPARENT FINGERPRINT SENSOR PATTERN

(71) Applicant: Synaptics Incorporated, San Jose, CA (US)

(72) Inventors: Guozhong Shen, San Jose, CA (US); Patrick Smith, San Jose, CA (US); Yongqian Tang, San Jose, CA (US); Jim Aroyan, San Jose, CA (US); Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 349 days.

(21) Appl. No.: 15/429,138

(22) Filed: Feb. 9, 2017

(65) Prior Publication Data

US 2017/0228573 A1    Aug. 10, 2017

Related U.S. Application Data

(60) Provisional application No. 62/293,308, filed on Feb. 9, 2016.

(51) Int. Cl.
*G06K 9/00* (2006.01)
*G06F 3/044* (2006.01)

(52) U.S. Cl.
CPC .......... *G06K 9/0002* (2013.01); *G06F 3/044* (2013.01); *G06K 9/00087* (2013.01)

(58) Field of Classification Search
CPC ... G06K 9/0002; G06K 9/00087; G06F 3/044
See application file for complete search history.

(56) References Cited

U.S. PATENT DOCUMENTS

| 8,638,107 B2 | 1/2014 | Schwartz et al. |
| 8,653,834 B2 | 2/2014 | Reynolds |
| 9,158,958 B2 | 10/2015 | Wickboldt et al. |
| 2007/0201784 A1* | 8/2007 | Kissa ............... E21B 11/005 385/8 |
| 2008/0136774 A1* | 6/2008 | Harris ............... G02F 1/1345 345/107 |
| 2008/0150906 A1 | 6/2008 | Grivna |

(Continued)

FOREIGN PATENT DOCUMENTS

| KR | 20130090081 A | * | 8/2013 |
| KR | 20140046888 A | | 4/2014 |

(Continued)

*Primary Examiner* — Yubin Hung
(74) *Attorney, Agent, or Firm* — Leydig, Voit & Mayer, Ltd.

(57) ABSTRACT

A transparent sensor pattern suitable for sensing fingerprint information in a display area is disclosed. The sensor pattern includes a receiver electrode extending in a first direction and a transmitter electrode extending in a second direction different from the first direction. The receiver electrode includes a conductive trace made from an opaque metal material and the receiver electrode is substantially free of transparent conductive material. The transmitter electrode includes a conductive segment made from a transparent conductive material. A dielectric material is disposed between the receiver electrode and the transmitter electrode, and the dielectric material electrically insulates the receiver electrode from the transmitter electrode.

16 Claims, 12 Drawing Sheets

(56) References Cited

U.S. PATENT DOCUMENTS

| | | |
|---|---|---|
| 2009/0236151 A1 | 9/2009 | Yeh et al. |
| 2009/0273577 A1* | 11/2009 | Chen ................... G06F 3/044 345/174 |
| 2011/0102567 A1 | 5/2011 | Erhart |
| 2011/0102569 A1 | 5/2011 | Erhart |
| 2011/0267298 A1 | 11/2011 | Erhart et al. |
| 2012/0113014 A1* | 5/2012 | Yilmaz ................ G06F 3/044 345/173 |
| 2012/0242606 A1* | 9/2012 | MacKey ............... G06F 3/044 345/173 |
| 2012/0242635 A1 | 9/2012 | Erhart et al. |
| 2012/0262412 A1* | 10/2012 | Guard ................. G06F 3/044 345/174 |
| 2013/0135247 A1 | 5/2013 | Na et al. |
| 2014/0191978 A1* | 7/2014 | Ng ...................... G06F 3/0416 345/173 |
| 2014/0267162 A1* | 9/2014 | Westhues ............ G06F 3/044 345/174 |
| 2014/0293145 A1* | 10/2014 | Jones .................. G06F 1/1626 349/12 |
| 2015/0002752 A1* | 1/2015 | Shepelev ............. G06F 3/044 349/12 |
| 2015/0030217 A1* | 1/2015 | Wickboldt ......... G06K 9/00026 382/124 |
| 2015/0082501 P1* | 3/2015 | Suphachadiwong .... A01H 5/02 |
| 2015/0144380 A1* | 5/2015 | Yang .................. H05K 1/097 174/253 |
| 2015/0227233 A1 | 8/2015 | Yi et al. |
| 2015/0378481 A1 | 12/2015 | Cok |
| 2015/0378494 A1 | 12/2015 | Cok |
| 2016/0170517 A1* | 6/2016 | Donnelly ............ G06F 3/0412 345/174 |

FOREIGN PATENT DOCUMENTS

| | | |
|---|---|---|
| KR | 101432988 | 8/2014 |
| KR | 101474733 | 12/2014 |

\* cited by examiner

TRANSPARENT FINGERPRINT SENSOR PATTERN

CROSS REFERENCE TO RELATED APPLICATIONS

This application claims priority to U.S. provisional patent application No. 62/293,308, filed on Feb. 9, 2016, the entire contents of which is hereby incorporated by reference in its entirety.

FIELD

The disclosed embodiments relate generally to sensors, and more particularly to transparent fingerprint sensor patterns suitable for capacitive sensing within a display active area and methods of manufacturing thereof.

BACKGROUND

Input devices including touch sensor devices (e.g., touchpad sensors, touch screen displays, etc.), as well as fingerprint sensor devices, are widely used in a variety of electronic systems.

Touch sensor devices typically include a sensing region, often demarked by a surface, in which the touch sensor device determines position information (e.g., the presence, location, and/or motion) of one or more input objects, typically for purposes allowing a user to provide user input to interact with the electronic system. Fingerprint sensor devices also typically include a sensing region in which the fingerprint sensor device determines fingerprint information (e.g., images of a full or partial fingerprint pattern, fingerprint features such as ridges or minutia, etc.), typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

Fingerprint sensor devices designed to capture fingerprint information typically differ from touch sensor devices that are designed to merely detect position information of a finger in a few ways. Most notably, capturing fingerprint information involves sampling much smaller structures than a typical touch sensor. While a touch sensor may be designed to sample an overall fingertip (e.g., on the order to approximately 5 mm in size or greater), a fingerprint sensor may be designed to sample individual surface variations on a fingertip surface (e.g., on the order of approximately 500 microns in size or less). As a result, the fingerprint sensor typically has a much higher spatial density of sensing elements than the touch sensor.

Some sensors used for touch sensing in a display area involve transparent electrodes (e.g., indium tin oxide (ITO)) to minimize the impact on visible graphics that are transmitted through the sensor device. Other sensors used for touch sensing involve opaque metals (e.g., copper) arranged in a fine but sparse grid of interconnected metal traces (sometimes known as "metal mesh") to effectively create larger sensor electrodes suitable for touch sensing while maintaining sufficient overall transparency that allows the graphics to be displayed through these interconnected traces.

Unfortunately, these sensors do not provide electrical properties suitable for capturing fingerprint information, nor do these sensors provide a sensing array that is both sufficiently dense enough to capture fingerprint information while remaining suitably transparent for integration within a display active area.

DETAILED DESCRIPTION

The following detailed description is exemplary in nature and is not intended to limit the invention or the application and uses of the invention. Furthermore, there is no intention to be bound by any expressed or implied theory presented in the preceding field, background, brief description of the drawings, the following detailed description, or the appended abstract.

Figure 1:
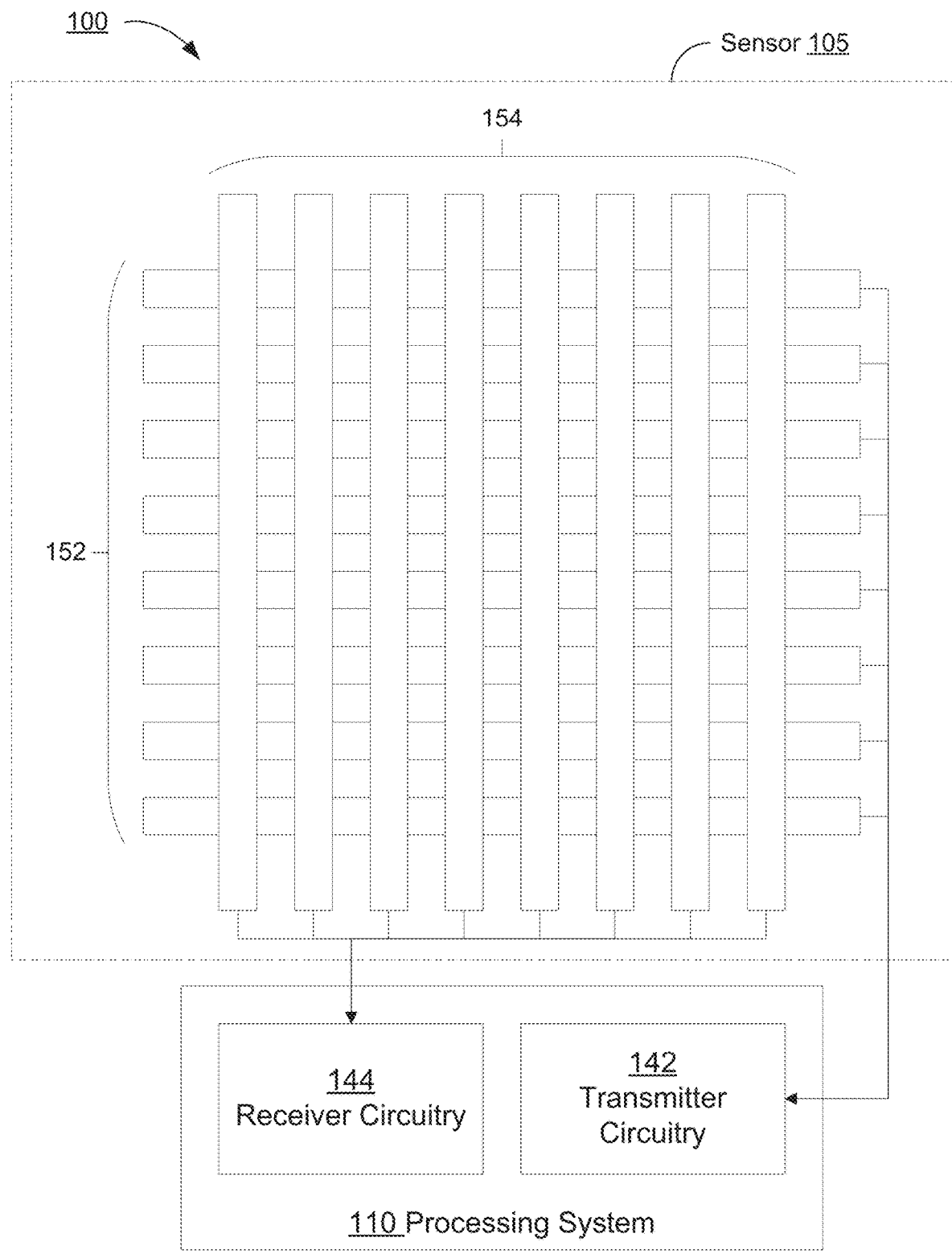
FIG. 1 is a block diagram of an exemplary input device, in accordance with some embodiments.

FIG. 1 is a block diagram of an exemplary input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers).

Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a sensor 105 is included with the input device 100. The sensor 105 comprises one or more sensing elements configured to sense input provided by one or more input objects in a sensing region. Examples of input objects include fingers, styli, and hands. Sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in some embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In some embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region. Some implementations utilize arrays or other regular or irregular patterns of multiple sensing elements to detect the input. Exemplary sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

The input device 100 includes a sensor 105 that uses capacitive techniques where voltage or current is applied to create an electric field. Nearby input objects cause changes in the electric field, and produce detectable changes in capacitive coupling that may be detected as changes in voltage, current, or the like. The sensor 105 includes sensor electrodes 152, 154, which are utilized as capacitive sensing elements. In FIG. 1, the sensor electrodes 152, 154 are shown arranged in an array. In some embodiments, the sensor electrodes 152, 154 may be arranged in other regular or irregular pattern to create electric fields.

One exemplary technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes 152 (also "transmitter electrodes") and one or more receiver sensor electrodes 154 (also "receiver electrodes"). Transmitter sensor electrodes 152 may be modulated relative to a reference voltage to transmit one or more transmitter signals. Receiver sensor electrodes 154 may be held substantially constant relative to the reference voltage to facilitate receipt of one or more resulting signals. The reference voltage may by a substantially constant voltage or system ground. The transmitter electrodes 152 are modulated relative to the receiver electrodes 154 to transmit transmitter signals and to facilitate receipt of resulting signals. A resulting signal may comprise effect(s) corresponding to one or more transmitter signals, and/or to one or more sources of environmental interference (e.g. other electromagnetic signals). When one or more input objects are present in a sensing region of the sensor 105, a resulting signal may also comprise effect(s) corresponding to the one or more input objects.

Another exemplary technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

In FIG. 1, a processing system 110 is included with the input device 100. The processing system 110 comprises parts of or all of one or more integrated circuits (ICs) and/or other circuitry components. The processing system 110 is coupled to (or configured to couple to) the sensor 105, and is configured to detect input in the sensing region using sensing hardware of the sensor 105.

The processing system 110 includes sensor circuitry configured to operate the sensor 105 for transcapacitance sensing, e.g., using the transcapacitance sensing methods described above. The processing system 110 includes transmitter circuitry 142 and receiver circuitry 144. The transmitter circuitry 142 includes one or more transmitter circuits (e.g., drivers, etc.) configured to transmit one or more transmitter signals with one or more transmitter sensor electrodes 152 of the sensor 105. The receiver circuitry 144 includes one or more receiver circuits (e.g., analog front ends, analog-to-digital converters, etc.) configured to receive one or more resulting signals with one or more receiver sensor electrodes of the sensor 105. The transmitter circuitry 142 may be coupled to the one or more transmitter electrodes 152 directly or through one or more intermediate electrical components (e.g., multiplexers, switches, amplifiers, and the like). Likewise, the receiver circuitry 144 may be coupled to the one or more receiver electrodes 154 directly or through one or more intermediate electrical components (e.g., multiplexers, switches, amplifiers, and the like).

In some embodiments, the processing system 110 may further include other components, such as circuitry for absolute capacitance sensing, optical sensing, acoustic sensing, and the like. The sensor electrodes 152, 154 may be dedicated transmitters or receivers (e.g., transmitter electrodes 152 may be dedicated only to transmitting signals and receiver electrodes 154 may be dedicated only to receiving signals), or one or more of the sensor electrodes 152, 154 may be configured to both transmit and receive (e.g., one or more of transmitter electrodes 152 may be configured to also receive one or more resulting signals in addition to transmitting one or more transmitter signals, and/or one or more of the receiver electrodes 154 may be also configured to transmit one or more transmitter signals in addition to receiving one or more receiver signals). Also, the sensor electrodes 152, 154 may be dedicated transcapacitance sensing elements configured to be operated to only sense transcapacitance, or may be configured to be operated to sense both transcapacitance and absolute capacitance. In some embodiments, separate ones of the sensor electrodes 152, 154 may be ohmically shorted together to form larger sensing elements (e.g., in a first mode of operation each of the sensor electrodes may be operated independently and in a second mode of operation multiple ones of the sensor electrodes may be operated together by ohmically shorting them together).

In some embodiments, the processing system 110 includes electronically-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

In some embodiments, the sensing region of the input device 100 may overlap part or all of an active area (i.e., area in which visible images are displayed) of a display device, for example, if the sensor 105 provides a touch screen interface or fingerprint sensing interface in a display area. In some embodiments, the sensor electrodes 152, 154 are formed with materials and a pattern providing a substantial overall transparency to minimize or eliminate interference with the graphics from display. The display device may be any suitable type of dynamic display capable of displaying a visual interface to a user, including an inorganic light emitting diode (ILED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for TFT circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Exampled of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device. The sensor electrode 152, 154 may be formed one or more transparent substrates, which in some embodiments includes the TFT substrate for the display, the cover glass of the display, a discrete transparent glass or plastic film (e.g., PET or another suitable film) inserted into the display stack, or a combination thereof.

Figure 2A:
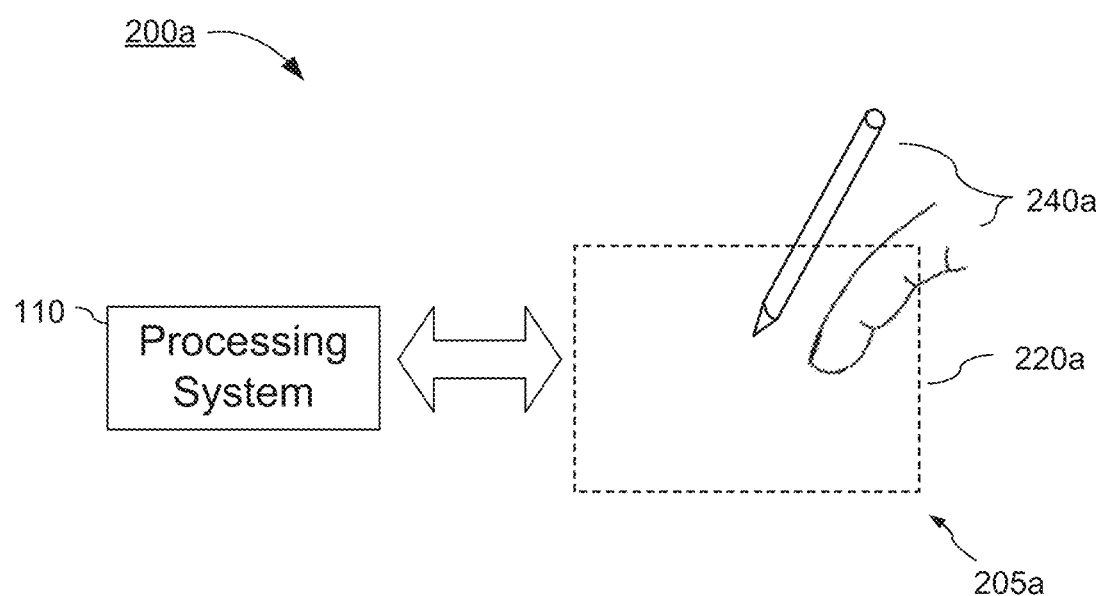
FIG. 2A is a block diagram of another exemplary input device, in accordance with some embodiments.
Figure 2B:
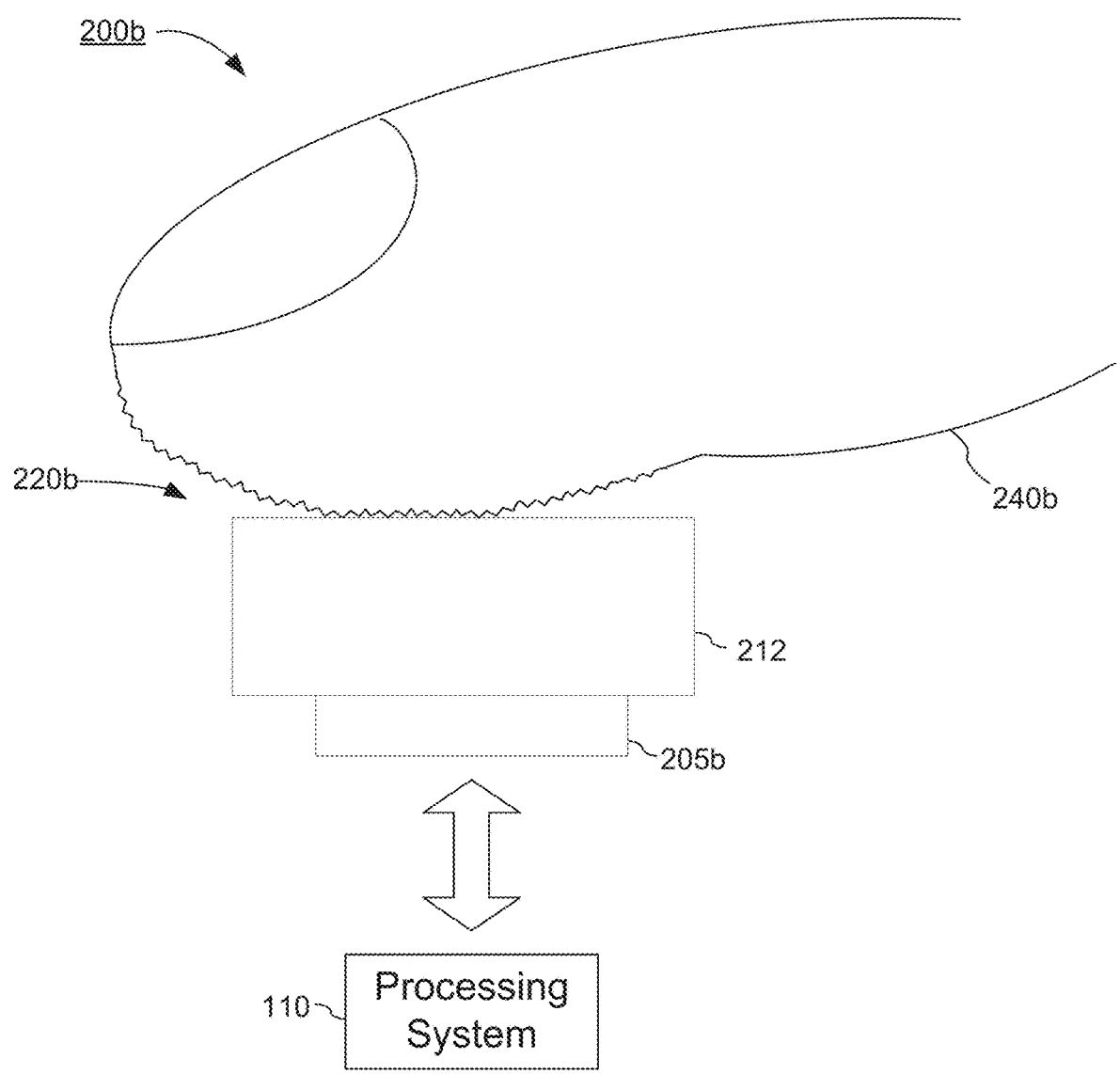
FIG. 2B is a block diagram of another exemplary input device, in accordance with some embodiments.

FIGS. 2A-2B depict further exemplary input devices 200a, 200b. In FIG. 2A, the input device 200a is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface. In some embodiments, a pitch of the touch sensing elements or a spacing between an adjacent pair of the touch sensing elements is between 2 and 6 mm, although it will be appreciated that other geometries may be suitable.

In FIG. 2B, the input device 200b is shown as including a fingerprint sensor 205b. The fingerprint sensor 205b is configured to capture a fingerprint from a finger 240b. The sensor 205b is disposed underneath a cover layer 212 that provides an input surface for the fingerprint to be placed or swiped over the sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A. In some embodiments, a pitch of the fingerprint sensing elements or a spacing between an adjacent pair of the fingerprint sensing elements is between 10 and 100 micron, although it will be appreciated that other geometries may be suitable.

Figure 3A:
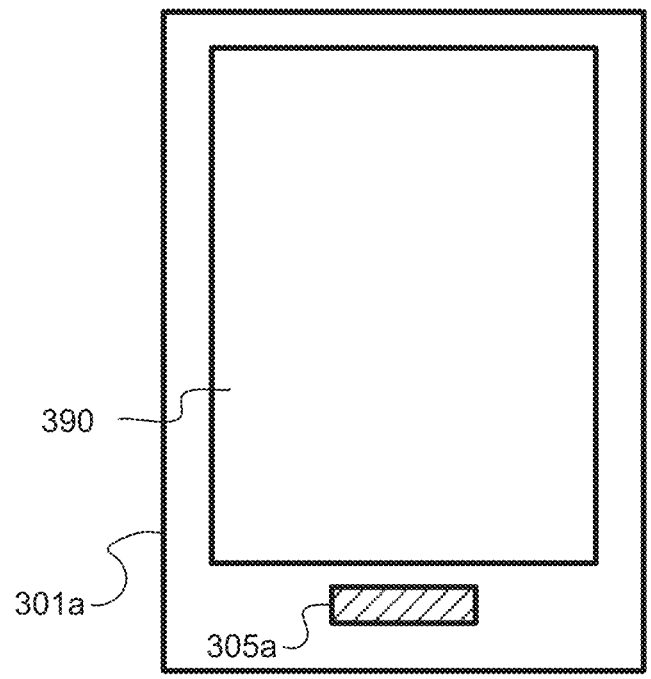
FIGS. 3A-3B are block diagrams illustrating exemplary electronic devices having both a touch screen interface and a fingerprint sensing interface, in accordance with some embodiments.
Figure 3B:
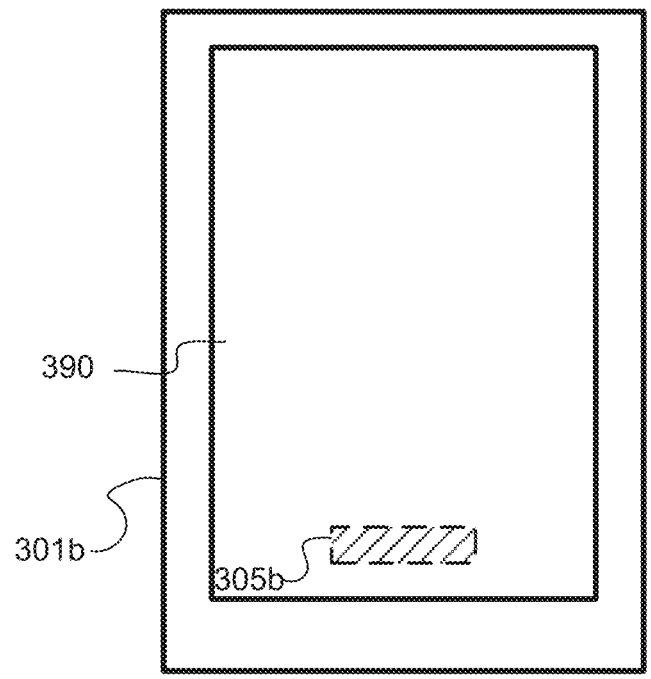

FIGS. 3A-3B are block diagrams illustrating exemplary electronic devices 301a and 301b having both a display active area and a fingerprint sensing interface. In FIG. 3A, the electronic device (e.g., a mobile device, such as a smartphone or tablet) 301a has a fingerprint sensor 305a that is separate from a display active area 390, such that the fingerprint sensor has a sensing region outside of the display active area 390. In FIG. 3B, the electronic device 301b has a fingerprint sensor 305b that overlaps with the display active area 390. In FIG. 3B, the fingerprint sensor 305b is shown as overlapping with only a portion of the display active area 390, but in some embodiments, the fingerprint sensor 305b may overlap with an entirety of the display active area 390.

Referring to FIGS. 1-3B, in some embodiments the sensor electrodes 152, 154 may be arranged in a pattern to provide an input sensing region suitable for integration within a display active area, and more particularly, to provide a fingerprint sensing region suitable for overlapping a display active area. Some exemplary sensor electrode patterns and methods of manufacturing thereof are shown and described below with reference to FIGS. 4-11.

Figure 4:
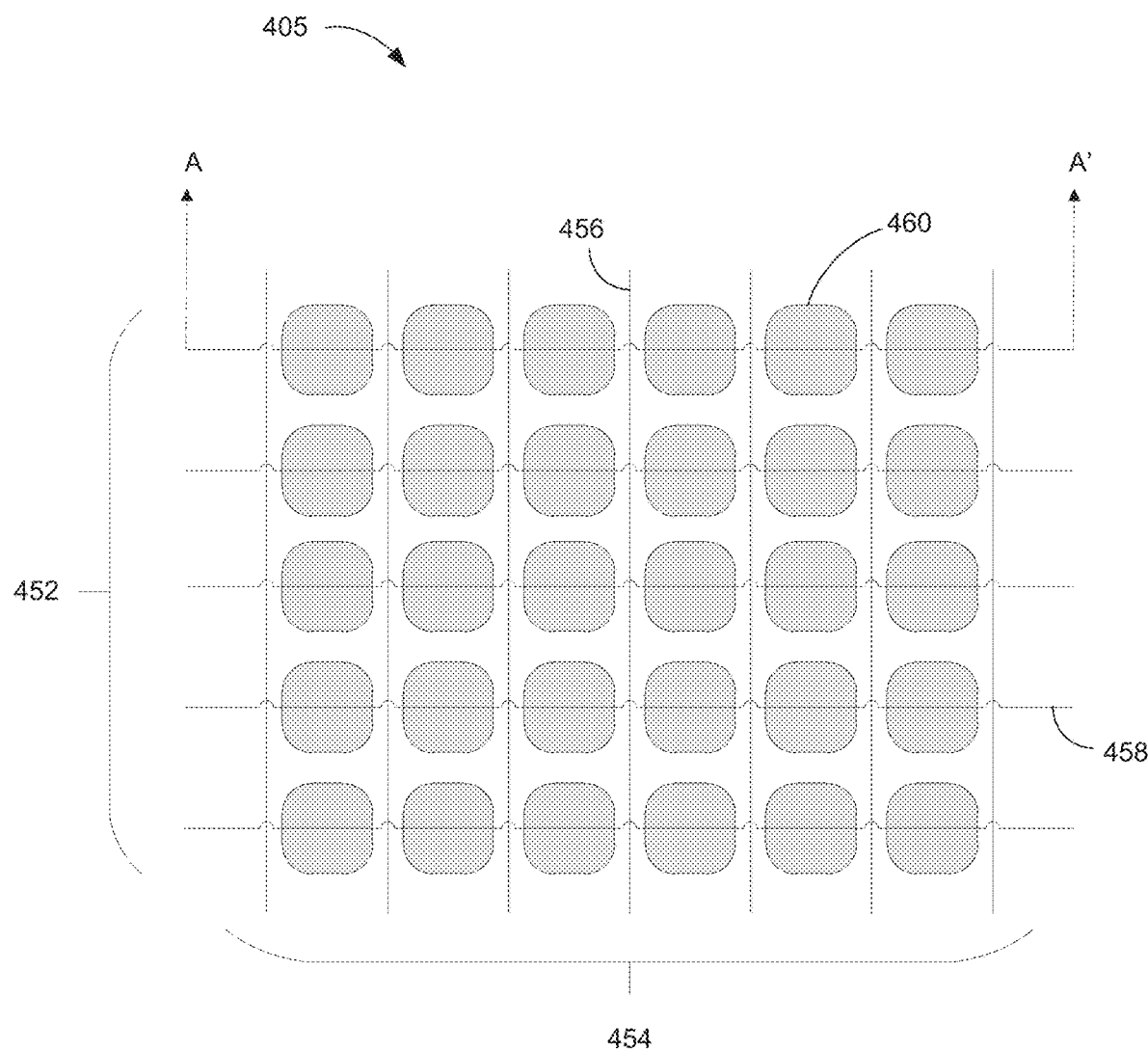
FIG. 4 is a block diagram of an exemplary sensor pattern, in accordance with some embodiments.

FIG. 4 is an illustration of an exemplary sensor 405. The sensor 405 includes a grid of sensor electrodes forming a two-dimensional array of sensing pixels for sensing an input object. The sensor electrode pattern includes a first set of sensor electrodes 454 extending in one direction and a second set of sensor electrodes 452 extending in a different direction. In FIG. 4, the first and second sets are shown as extending in directions orthogonal to each other, but other arrangements may be used. The first and second sets of sensor electrodes are electrically isolated from each other by an insulator (e.g., a dielectric material), and form a transcapacitive sensor array with sensing pixels based on capacitive coupling between receiver electrodes and transmitter electrodes. For example, in FIG. 4, the sensor electrodes 452 may form a set of transmitter electrodes and the sensor electrodes 454 may form a set of receiver electrodes, or vice versa.

A processing system (such as the processing system 110 in FIGS. 1-2) may be connected to the sensor 405 to sense input. During operation, the processing system may drive sensing signals and detect resulting signals onto the sensor electrodes. For example, the processing system may include transmitter circuitry connected to the sensor electrodes 452 configured to drive transmitter signals onto each of the sensor electrodes 452, and receiver circuitry connected to the sensor electrodes 454 configured to receive resulting receiver signals from each of the sensor electrodes 454. The processing system may also be configured to operate the sensor 405 in an absolute capacitive sensing mode, by detecting capacitive coupling between the sensor electrodes and an input object.

The sensor electrode pattern shown in the embodiment in FIG. 4 is configured to be substantially transparent. This may render the sensor electrode pattern suitable for integration within the active area of display. The sensor electrodes include both metal traces 456/458, and transparent conductive segments 460. The metal traces 456/458 may be made of opaque metal materials, such as Copper (Cu), Aluminum (Al), Silver (Au), Gold (Ag), Chromium (Cr), Molybdenum (Mo), metal alloys, and the like, while the transparent conductive segments 460 may be made of transparent conductive materials, such as Poly(3,4-ethylenedioxythiophene) (PEDOT), Indium Tin Oxide (ITO), Indium Zinc Oxide (IZO), Aluminum Zinc Oxide (AZO), other transparent conductive oxides, and the like. The metal traces 456/458 may be thin, for example 1-2 µm wide, and may provide low electrical resistance and minimal impact to the overall transparency of the sensing area, while the transparent conductive segments may be wider to provide desired capacitive coupling for shaping the electrical field extending into the sensing region without unduly interfering with the appearance of the display.

In FIG. 4, each of the respective sensor electrodes 452 includes a plurality of transparent conductive segments physically separated from each other, but electrically connected to each other through a respective metal trace 458. Also shown in FIG. 4, in areas along the length of the sensor electrode 452 where the sensor electrode is overlapped by the other sensor electrodes 456, the sensor electrode 452 is free of transparent conductive material. As shown in FIG. 4, the transparent conductive segments 460 may be positioned in areas between the intersecting sensor electrodes 456, and likewise, metal traces 456 may be positioned in areas between adjacent transparent conductive segments 460.

Figure 5A:
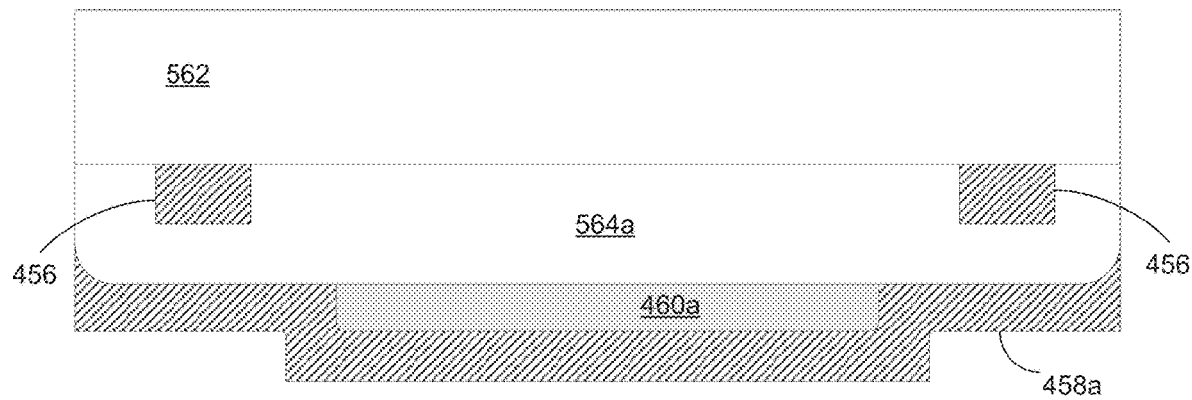
FIGS. 5A-5C are block diagrams illustrating cross sections of exemplary sensor patterns, in accordance with some embodiments.
Figure 5B:
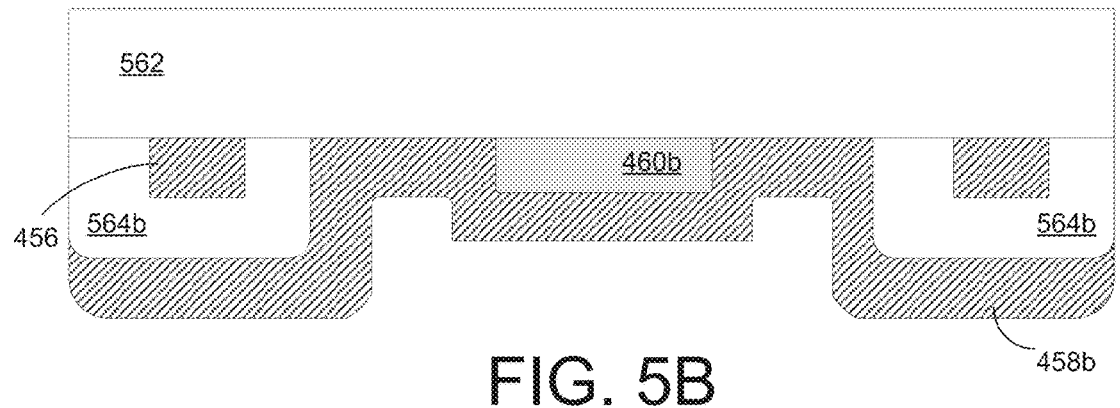
Figure 5C:
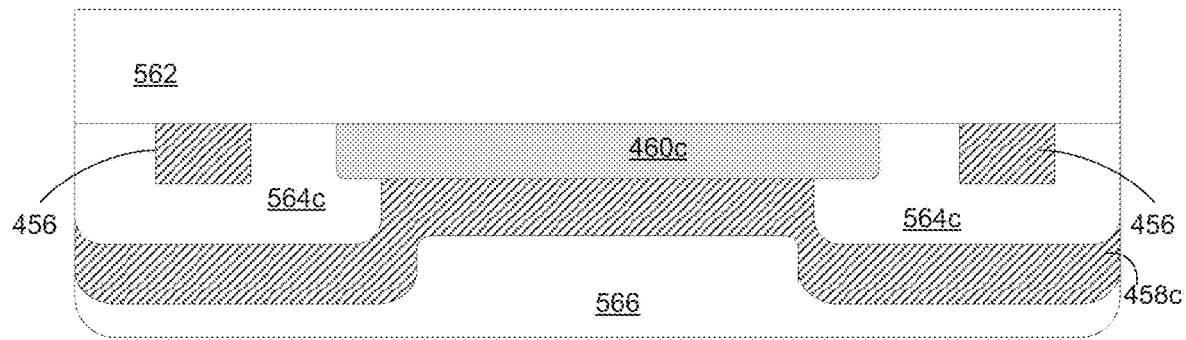

FIGS. 5A-5C depict various exemplary cross sections of the sensor 405 along line A-A' shown in FIG. 4.

In FIG. 5A, the sensor 405 includes a substrate 562. The substrate 562 may include a transparent material, such as glass or plastic. For example, the substrate 562 may include a cover glass of a display device, a transparent film, or another suitable substrate. The metal traces 456 of the set of electrodes 454 and transparent conductors 460a of the other set of electrodes 452 are formed in different layers and on different planes. The metal traces 456 are disposed on or over the substrate 562, and an insulation layer 564a (e.g., dielectric layer) is disposed on or over the metal traces 456. The insulation layer 564a may cover an entire sensing area of the sensor 405, and the transparent conductive segments 460a are formed on or over the insulation layer 564a. The metal traces 458a are disposed on or over the transparent conductive segments 460a and on or over the insulator 564a, and the metal traces 458a are electrically connected to the transparent conductive segments 460a (e.g., the metal traces 458a and transparent conductive segments 460a make ohmic contact).

FIGS. 5B-5C depict additional exemplary cross sections along A-A', which differ from the construction shown in FIG. 5A in that at least a portion of the transparent conductive segments 460 of the set of electrodes 452 are disposed in a common plane with at least a portion of the metal traces 456 of the other set of electrodes 454, which may provide for improved signal based on capacitive coupling between these two sets of electrodes.

In FIG. 5B, the metal traces 456 and transparent conductors 460b are disposed in the same layer. The metal traces 456 of the set of electrodes 454 and transparent conductor segments 460b of the other set of electrodes are disposed on or over the substrate 562. An insulation layer 564b is disposed on or over the metal traces 456, in selective portions (or dielectric islands) over the metal traces 456, while remaining areas are free of the insulator 564b. The metal traces 458b are disposed on or over the insulator portions 564b and on or over the transparent conductor segments 460b. A portion of the metal traces 458b are also disposed on the same substrate plane as the transparent conductor segments 460b and the metal traces 456, and the metal traces 458b are electrically connected to the transparent conductor segments 460b. If the sensor electrodes are used in a transcapacitive sensor, the performance in FIG. 5B may be increased relative to FIG. 5A due to portions of the transmitter electrodes and the receiver electrodes being positioned in the same plane.

In FIG. 5C, the metal traces 456 and transparent conductor segments 460c are disposed in the same layer. The metal traces 456 of the set of electrodes 454 and transparent conductor segments 460c of the other set of electrodes are disposed on or over the substrate 562. An insulation layer 564b is disposed over the metal traces 456, in selective portions (or dielectric islands) over the metal traces 456. A portion of the insulator 564c is also disposed over the transparent conductor segment 460c, while a remainder of the transparent conductor segment 460c is free of the insulator 564c to allow electrical contact between the metal trace 458c and the transparent conductor segment 460c. The metal trace 458c is disposed over the insulator and over the transparent conductive segment 460c. A passivation layer 566 is disposed over the metal traces 458c.

In FIG. 5C, a portion of the insulator 564c is disposed between the metal trace and the transparent conductive segment 460c, which may allow for better scratch resistance during processing compared to the example shown in FIG. 5B. Also, compared to using a continuous transparent conductor along the length of the metal trace, the use of separate transparent conductor segments 460b physically isolated from each other in FIGS. 5B and 5C allows the transparent conductor segments 460c to be formed directly on the substrate 562, for example, by depositing ITO on glass, without having to form the transparent conductor on the insulator 564b/c that electrically isolates these sensor electrodes from each other.

The conductive layers may be formed and patterns using any suitable technique, including known sputtering processes, deposition processes, etch processes, and the like. It should be noted that the sensor pattern of FIG. 4 can be achieved with other constructions. In some embodiments, the two sets of electrodes 452, 454 are formed on opposing sides of the same substrate. In some embodiments, the two sets of electrodes 452, 454 are formed on different substrates which are then positioned one on top of the other. In some embodiments, the ordering of the conductive and dielectric layers are reversed or positioned in a different suitable order.

Figure 6:
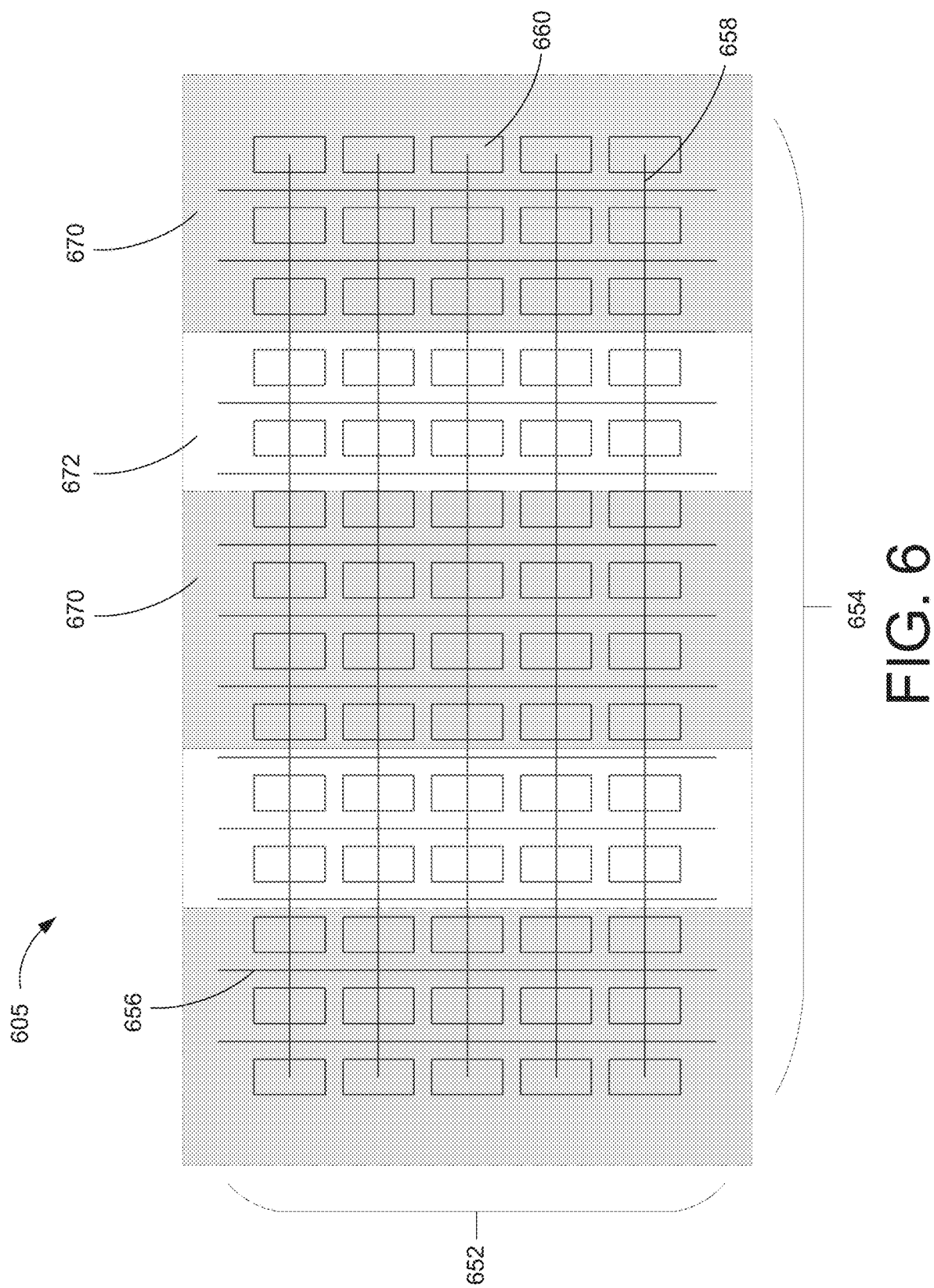
FIG. 6 is a block diagram of an exemplary fingerprint sensor pattern, in accordance with some embodiments.

Another exemplary sensor 605 is depicted in FIG. 6. FIG. 6 depicts an exemplary fingerprint sensor pattern having a plurality of sensor electrodes 652, 654 with dimensions configured to capture surface variations of a finger surface. An example of a fingerprint ridge 670 and valley 672 pattern corresponding surface variations of a finger is depicted in FIG. 6 in plan view over the sensing area. The sensor 605 includes a plurality of receiver sensor electrodes 654 shown vertically in the illustration, and a plurality of transmitter sensor electrodes 652 shown horizontally in the illustration. A pitch of the receiver (vertical) sensor electrodes is less than a spacing between a pair of fingerprint ridges 670. The same is true for the plurality of transmitter (horizontal) sensor electrodes, in order to provide a sufficient sampling density of the features of interest.

In FIG. 6, each respective transmitter electrode 652 includes a metal trace 658 and a plurality of transparent conductor segments 660 physically segregated from each other but electrically connected to each other through the respective metal trace 658. Also in FIG. 6, each respective receiver electrode includes a metal trace 656 and is free of transparent conductive segments. Loading on the receiver electrodes 652 is reduced and signal is improved by having the transmitter electrodes 652 free of the transparent conductive segments in the cross-over locations between transmitter and receiver electrodes. Also, for fingerprint sensing, having a low RC constant may be an important parameter. Compared with a pure ITO sensor electrode pattern, for example, the RC constant is reduced using the sensor pattern of FIG. 6 due to the higher conductivity of the metal traces. Further, unlike the transmitter electrodes only a thin metal trace is sufficient for the receiver electrodes to achieve good signal for fingerprint sensing. Thus, the receiver electrodes does not include metal traces that are made as wide as portions of the transmitter electrodes (which could impact the transparency of the sensor without improving the signal), and the receiver electrodes do not include extra ITO (which would add extra manufacturing steps and cost).

Figure 7:
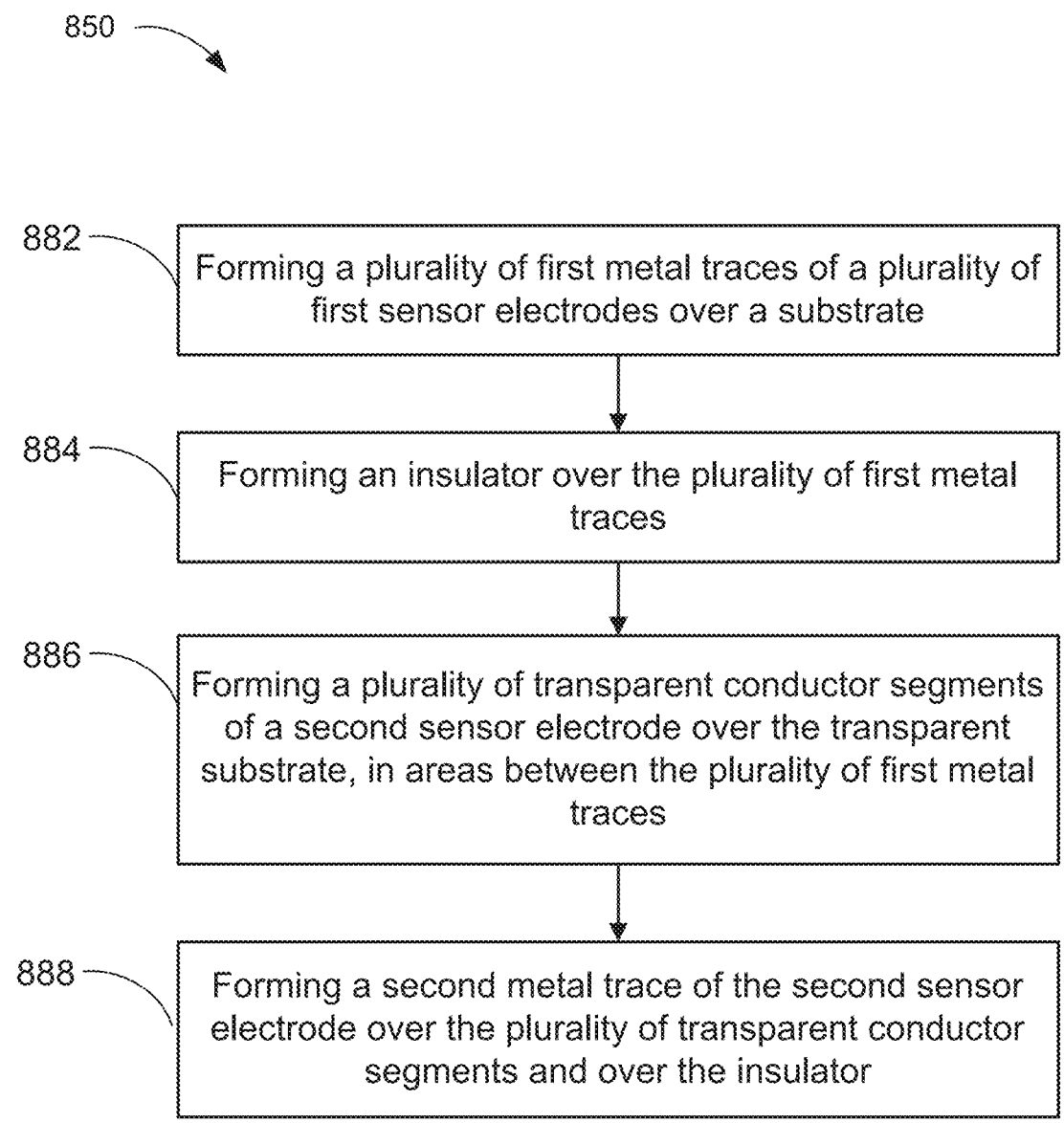
FIG. 7 is a flowchart illustrating an exemplary method of forming a sensor pattern, in accordance with some embodiments.

FIG. 7 depicts an exemplary method 850 of making a sensor pattern in accordance with the patterns shown in FIGS. 4-6. With reference to the examples shown in FIGS. 5A-5C, at step 882, a plurality of first metal traces 456 of a plurality of first sensor electrodes are formed over a substrate 562. The substrate 562 may be a transparent substrate, such as transparent film or a cover glass for a display device. At step 884, an insulator 564a-c is formed over the plurality of first metal traces 456. The insulator may include a suitable dielectric material. At step 886, a plurality of transparent conductor segments 460a-c are formed in areas between the plurality of first metal traces 456. At step 888, a second metal trace 458b is formed over the plurality of transparent conductor segments 460a-c and electrically connected to the plurality of transparent conductor segments 460a-c.

It is noted that formation of the transparent conductor segments 460a-c at step 886 may be performed before, after, or at the same time as formation of the first metal traces 456 at step 882. For example, the transparent conductor segments 460a of FIG. 5A may be formed on the insulator 564a after formation of the first metal traces at 456. As another example, the transparent conductor segments 460b-c of FIGS. 5B-5C may be formed before formation of the first metal traces 456 by depositing ITO on a glass substrate. As yet another example, the transparent conductor segments 460b-c of FIGS. 5B-5C may be formed at the same time as the metal traces by depositing both metal and ITO layers on the substrate at the same time, then patterning (e.g., etching) both the metal and ITO layers at the same time.

It is also noted that formation of the insulator 564a-c at step 884 may be performed before or after formation of the transparent conductive segments 460a-c. For example, the insulator 564c of FIG. 5C may be formed after formation of the transparent conductor segments 460c, and a portion of the insulator 546c may be formed over a portion of the transparent conductor segments 460c to provide improved scratch resistance during processing.

After formation of the second metal trace 458a-c at step 888, a passivation layer may be formed over the second metal trace 458b.

Figure 8:
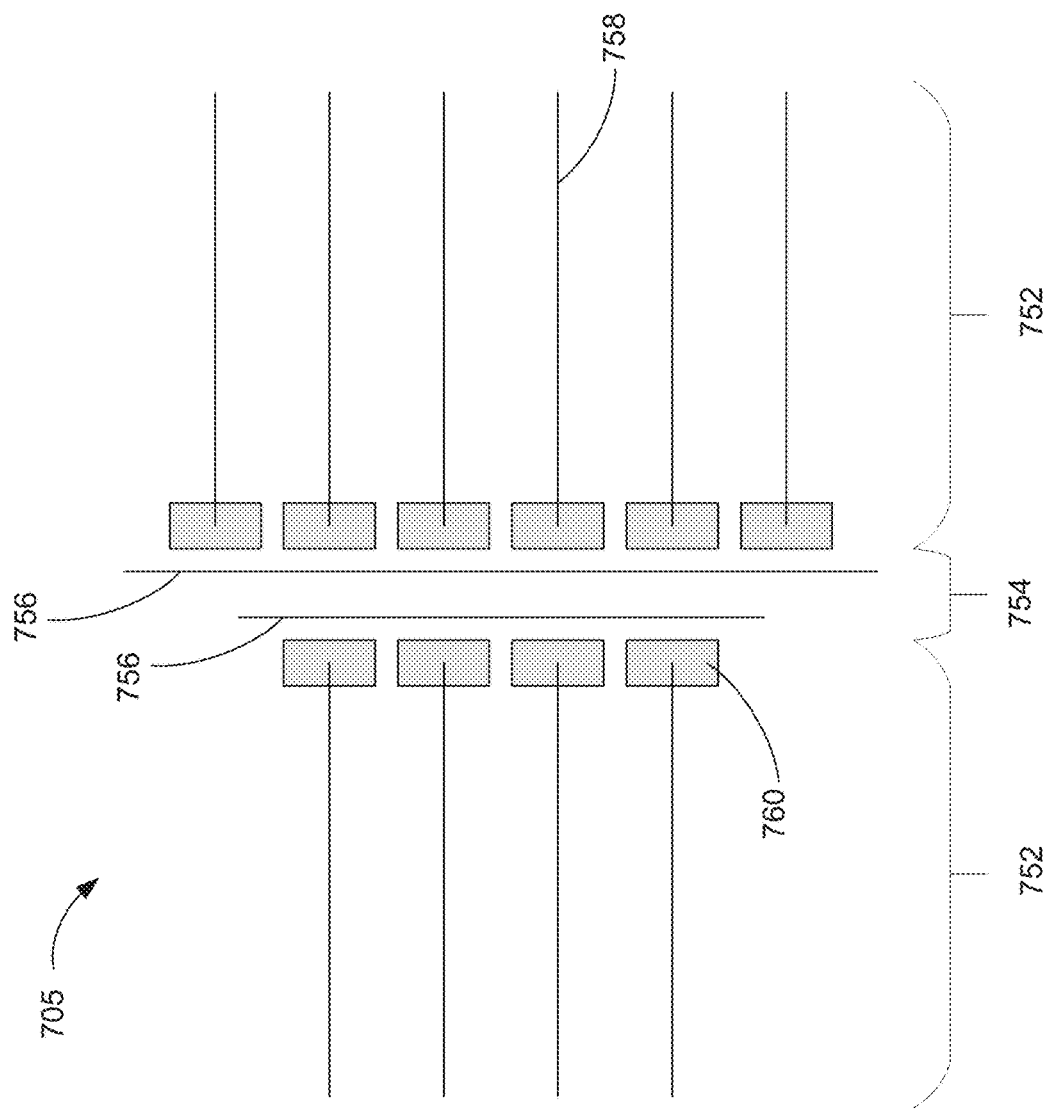
FIG. 8 is a block diagram of an exemplary swipe sensor pattern, in accordance with some embodiments.

FIG. 8 depicts another exemplary sensor 705. The sensor 705 includes a linear array of sensing pixels based on capacitive couplings between the ends of the set of sensor electrodes 752 and the set of sensor electrodes 754, which may extend in an orthogonal direction to the sensor electrodes 752. The sensor arrangement of FIG. 7 may provide a swipe sensor for sensing a fingerprint based on relative movement between a finger and the sensing surface. A pair of linear arrays is shown, where the second linear array (such as the smaller array shown on the left side of the figure) may facilitate reconstruction of an image from a series of scans during the relative movement and/or detection of motion information from a finger. Each respective sensor electrode 752 includes a metal trace 758 and a transparent conductive segment 760 electrically connected to the metal trace 758 at an end of the sensor electrode 752. Each respective sensor electrode 754 includes a metal trace 756. The sensor electrodes 754 may also be free of transparent conductive material. In some embodiments, the sensor electrodes 754 are receiver electrodes, and the sensor electrodes 752 are transmitter electrodes. The transparent conductive segments 760 may increase capacitive coupling to between the ends of the transmitter electrodes and the receiver electrodes without unduly impacting the overall transparency of the sensor. Unlike the two dimensional array shown in FIG. 4, the transmitter electrodes and receiver electrodes can be disposed side by side in a common plane, and thus the traces 758 and the traces 756 need not overlap each other.

Figure 9:
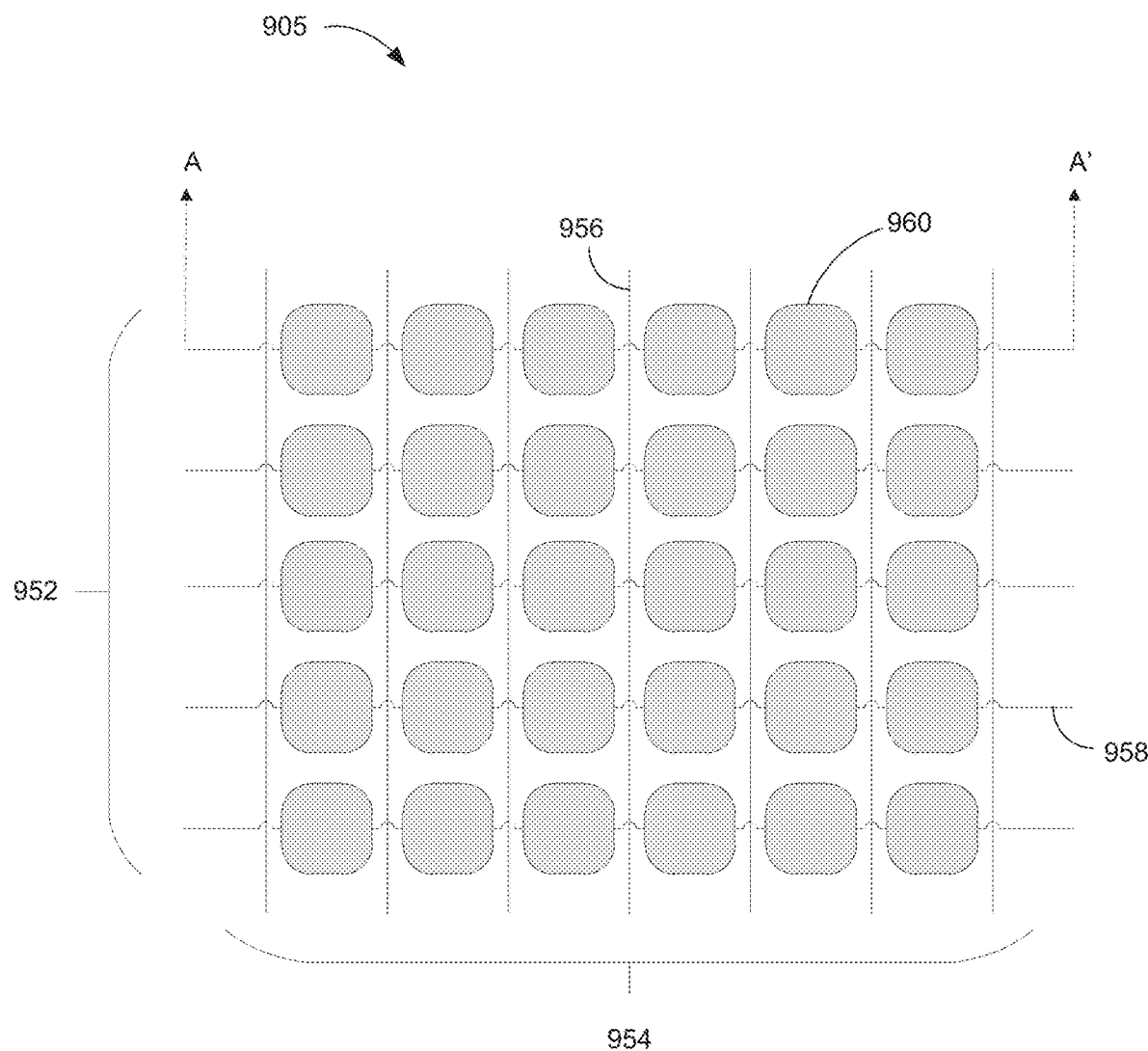
FIG. 9 is a block diagram of an exemplary sensor pattern, in accordance with some embodiments.

FIG. 9 is an illustration of another exemplary sensor 905. The sensor 905 includes a grid of electrodes that includes a set of transmitter electrodes 952 and a set of receiver electrodes 954. The transmitter electrodes 952 include a plurality of transparent conductive segments 960 while the receiver electrodes 952 include metal traces 956 and are free of transparent conductive material. Unlike in FIG. 4, in FIG. 9 each of the electrodes 952 include metal traces 958 do not extend all the way across the length of each electrode. Rather, multiple ones of the transparent conductive segments 960 are interconnected by multiple sets of metal traces 958 disposed along the length of the electrode.

Figure 10:
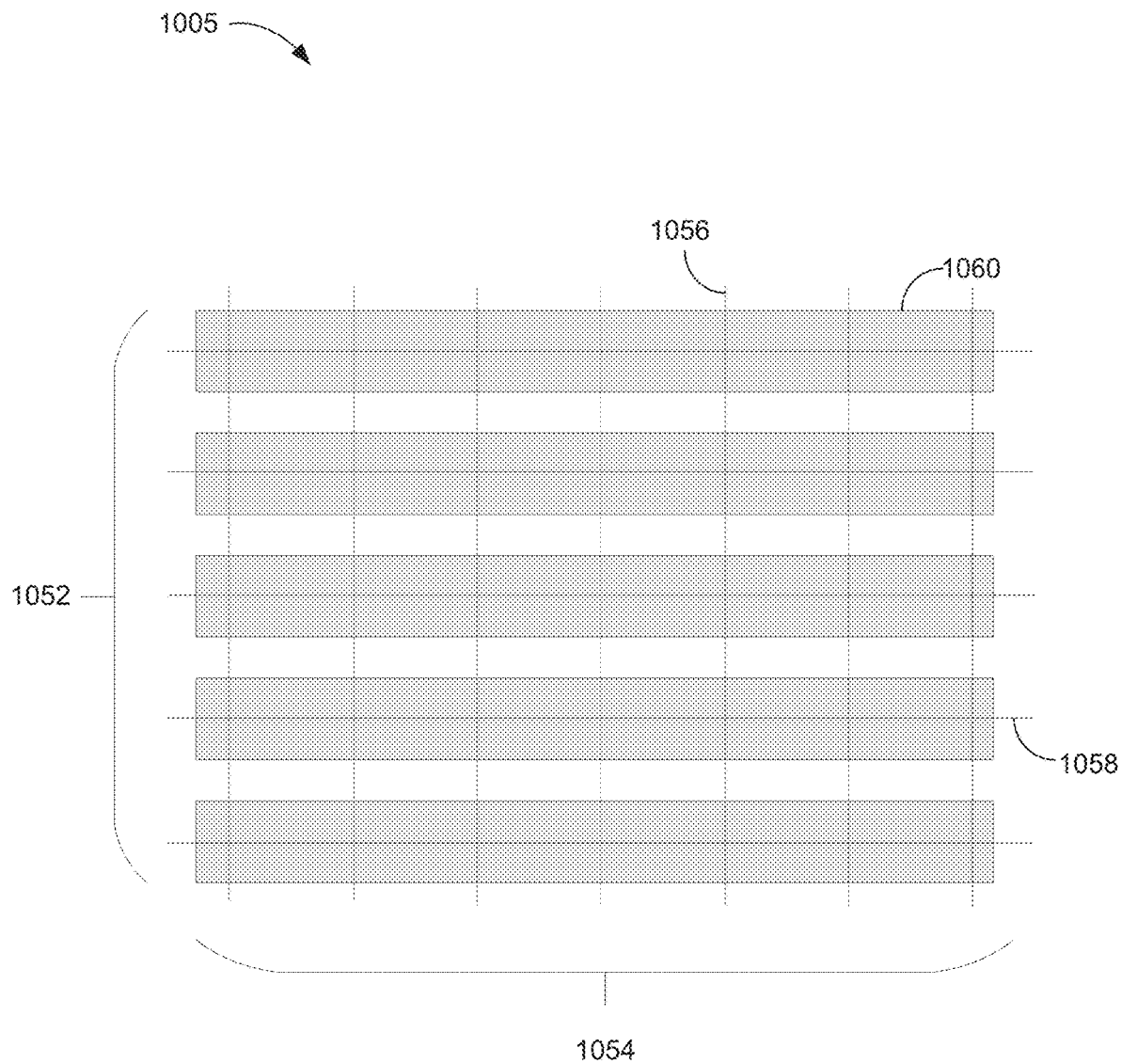
FIG. 10 is a block diagram of an exemplary sensor pattern, in accordance with some embodiments.

FIG. 10 is an illustration of another exemplary sensor 1005. The sensor 1005 includes a grid of electrodes that includes a set of transmitter electrodes 1052 and a set of receiver electrodes 1054. Each of the receiver electrodes 1056 includes a metal trace and is free of transparent conductive material. Each of the transmitter electrodes 1052 includes a metal trace 1058 and a transparent conductive segment 1060 that overlaps with multiple ones of the receiver electrodes. Unlike in FIGS. 4, in FIG. 10 the metal traces 1056 of the receiver electrodes 1054 are not positioned between segregated transparent conductive segments of the transmitter electrodes 1052, but instead overlap with portions of the transparent conductive segments. Thus, loading on the receiver electrodes 1054 is increased and signal strength may be decreased compared to those sensor patterns. However, in some embodiments the signal may be sufficient due to the transparent "bars and stripes" arrangement, in which the receiver electrodes are made thin and free of transparent conductive material, while the transmitter electrodes are made wider than the receiver electrodes using transparent conductive segments 1052.

Figure 11:
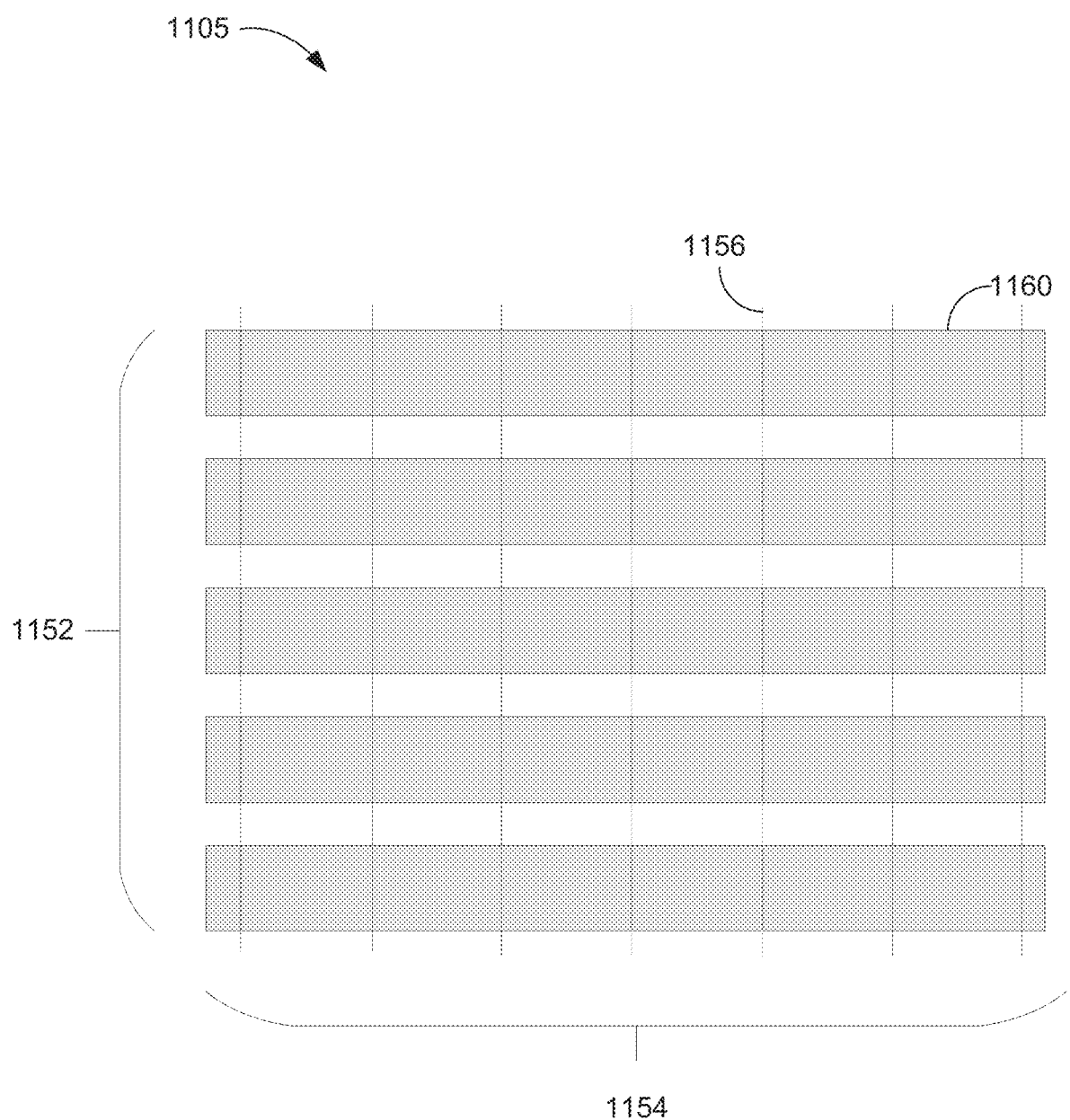
FIG. 11 is a block diagram of an exemplary sensor pattern, in accordance with some embodiments.

FIG. 11 is an illustration of another exemplary sensor 1105. The sensor 1105 includes a grid of electrodes that includes a set of transmitter electrodes 1152 and a set of receiver electrodes 1154. Each of the receiver electrodes 1156 includes a metal trace and is free of transparent conductive material. Each of the transmitter electrodes 1152 includes a transparent conductive segment 1160 that overlaps with multiple ones of the receiver electrodes, but is free of a metal trace within the sensing area. Unlike in FIG. 4, in FIG. 11 the transmitter electrodes do not include metal traces within the sensing area, but instead are formed entirely from transparent conductive material within the sensing area. The transparent conductive material may have higher resistance than the metal traces of the receiver electrodes. However, in some embodiments a suitable signal for capturing fingerprint information may be achieved so long as the receiver electrodes include lower resistance metal material.

It should be noted that the sensor patterns described above may be used to capture other information besides fingerprint information, examples of which include palm print information, other biometric information, and other high resolution information. It should also be noted that in the figures, lines are depicted as straight for schematic illustration, but they need not be perfectly straight in all cases. For example, in some embodiments metal traces may extend generally in a primary direction across the sensing area, but may include zig zag patterns and other variations along their length, to mitigate against moire artifacts in display graphics, in a manner known in the art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sensor comprising:
 a receiver electrode extending in a first direction, wherein the receiver electrode comprises a conductive trace made from an opaque metal material and the receiver electrode is substantially free of transparent conductive material;
 a transmitter electrode extending in a second direction different from the first direction, wherein the transmitter electrode comprises a first conductive segment made from a transparent conductive material, a second conductive segment made from the transparent conductive material, and a conductive trace made from an opaque metal material, wherein the conductive trace of the transmitter electrode electrically connects the first conductive segment to the second conductive segment, and wherein the conductive trace of the transmitter electrode extends across a length of the transmitter electrode in the second direction; and a dielectric material disposed between the receiver electrode and the transmitter electrode, wherein the dielectric material electrically insulates the receiver electrode from the transmitter electrode.

2. The sensor of claim 1, wherein at least a portion of the first conductive segment of the transmitter electrode and at least a portion of the conductive trace of the receiver electrode are disposed in a common plane.

3. The sensor of claim 1, wherein the conductive trace of the transmitter electrode overlaps with the conductive trace of the receiver electrode, wherein the conductive trace of the receiver electrode is disposed in an area between the first conductive segment and the second conductive segment.

4. The sensor of claim 1, wherein the first conductive segment of the transmitter electrode is wider than the conductive trace of the receiver electrode.

5. The sensor of claim 1, wherein the transmitter electrode overlaps with a plurality of receiver electrodes, wherein the transmitter electrode comprises a plurality of conductive segments made from the transparent conductive material, wherein each of the transparent conductive segments is disposed between at least two of the receiver electrodes.

6. The sensor of claim 1, wherein the first direction and the second direction are substantially orthogonal to each other.

7. The sensor of claim 1, wherein the receiver electrode and the transmitter electrode are dimensioned to capture fingerprint information.

8. The sensor of claim 1,
wherein the receiver electrode is one of a plurality of receiver electrodes extending in the first direction, wherein each of the plurality of receiver electrodes comprises a conductive trace made from an opaque metal material and wherein each of the plurality of receiver electrodes is substantially free of transparent conductive material; and
wherein the transmitter electrode is one of a plurality of transmitter electrodes extending in the second direction, wherein each of the plurality of transmitter electrodes comprises a plurality of conductive segments made from the transparent conductive material, wherein each conductive segment of the plurality of conductive segments of each of the plurality of transmitter electrodes is wider than the conductive trace of each of the plurality of receiver electrodes.

9. The sensor of claim 8, wherein each conductive segment of the plurality of conductive segments is disposed between at least two conductive traces of the receiver electrodes.

10. The sensor of claim 8, wherein a spacing between a pair of the receiver electrodes is between 10 micron and 100 micron, and wherein a spacing between a pair of the transmitter electrodes is between 10 micron and 100 micron.

11. The sensor of claim 1, wherein the transparent conductive material comprises a transparent conductive oxide or PEDOT.

12. An input device for capacitive fingerprint sensing, the input device comprising:
a plurality of receiver electrodes extending in a first direction, wherein each of the receiver electrodes comprises a conductive trace made from an opaque metal material and each of the receiver electrodes is free of transparent conductive material;
a plurality of transmitter electrodes extending in a second direction different from the first direction, wherein each of the plurality of transmitter electrodes comprises a first conductive segment made from a transparent conductive material, a second conductive segment made from the transparent conductive material, and a conductive trace made from an opaque metal material, wherein the conductive trace of the transmitter electrode electrically connects the first conductive segment to the second conductive segment, and wherein the conductive trace of the transmitter electrode extends across a length of the transmitter electrode in the second direction;
a dielectric material disposed between the plurality of receiver electrodes and the plurality of transmitter electrodes, wherein the dielectric material electrically insulates the plurality of receiver electrodes from the plurality of transmitter electrodes; and
a processing system comprising circuitry configured to operate the plurality of receiver electrodes and the plurality of transmitter electrodes for transcapacitance sensing to capture a fingerprint.

13. The input device of claim 12, wherein the processing system comprises:
transmitter circuitry coupled to the plurality of transmitter electrodes and configured to apply transmitter signals to the plurality of transmitter electrodes; and
receiver circuitry coupled to the plurality of receiver electrodes and configured to receive resulting signals at the plurality of receiver electrodes.

14. The input device of claim 12, wherein each of the plurality of transmitter electrodes comprises more than two conductive segments made from the transparent conductive material.

15. A capacitive sensor, comprising:
a first sensor electrode extending in a first direction, the first sensor electrode comprising a first metal trace, wherein the first sensor electrode is free of transparent conductive material;
a second sensor electrode extending in a second direction different from the first direction, the second sensor electrode comprising a first transparent conductive segment, a second transparent conductive segment, and a second metal trace, wherein the second metal trace electrically connects the first transparent conductive segment to the second transparent conductive segment, wherein the second metal trace of the second sensor electrode extends across a length of the second sensor electrode in the second direction; and
an insulator separating the first sensor electrode from the second sensor electrode.

16. The capacitive sensor of claim 15, wherein the second sensor electrode comprises more than two transparent conductive segments electrically connected to the second metal trace.

* * * * *